United States Patent
Herbert et al.

(10) Patent No.: US 11,843,908 B2
(45) Date of Patent: *Dec. 12, 2023

(54) REMOTE SPEAKER MICROPHONE UNIT FOR USE WITH HEADSET

(71) Applicant: Safariland, LLC, Jacksonville, FL (US)

(72) Inventors: Don Herbert, Clarkston, MI (US); Peter Hoang, Corona, CA (US); John Brad Medine, Chino, CA (US); David Trinh Le, Irvine, CA (US)

(73) Assignee: Safariland, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,670

(22) Filed: Apr. 1, 2022

(65) Prior Publication Data

US 2022/0225012 A1  Jul. 14, 2022

Related U.S. Application Data

(63) Continuation of application No. 16/846,860, filed on Apr. 13, 2020, now Pat. No. 11,297,409.

(60) Provisional application No. 62/835,911, filed on Apr. 18, 2019.

(51) Int. Cl.
 *H04R 1/10* (2006.01)

(52) U.S. Cl.
 CPC ....... *H04R 1/1041* (2013.01); *H04R 2420/07* (2013.01)

(58) Field of Classification Search
 CPC ................... H04R 1/1041; H04R 2420/07
 USPC ............................................ 381/74, 72, 81
 See application file for complete search history.

(56) References Cited

U.S. PATENT DOCUMENTS

| | | | |
|---|---|---|---|
| 5,400,406 A | 3/1995 | Heline, Jr. | |
| 8,599,011 B2 | 12/2013 | Schantz et al. | |
| 9,948,013 B2 | 4/2018 | Houseworth et al. | |
| 9,973,327 B2 | 5/2018 | Qu | |
| 10,075,790 B2 | 9/2018 | Hernandez | |
| 10,491,999 B2 * | 11/2019 | Hernandez | H04R 1/1041 |
| 10,575,775 B2 * | 3/2020 | Namm | G16H 80/00 |
| 11,076,248 B2 * | 7/2021 | Holter | G10K 11/17833 |
| 2003/0092399 A1 | 5/2003 | Davies | |
| 2007/0004464 A1 | 1/2007 | Lair | |
| 2008/0085679 A1 | 4/2008 | Fettig | |

(Continued)

*Primary Examiner* — Disler Paul
(74) *Attorney, Agent, or Firm* — Kane Kessler, P.C.; Barry E. Negrin

(57) ABSTRACT

A remote speaker microphone (RSM) unit enables a user to use either a headset or an in-ear speaker with the RSM unit. The RSM unit includes a first RSM connection for communicating and connectable with the first connection of the headset; and a second RSM connection for communicating and connectable with the second connection of the in-ear speaker. Connecting either the headset or the in-ear speaker to the RSM unit disables the speaker and microphone of the RSM unit. At least one of the first and second connections are wireless, e.g., Bluetooth or NFC, and at least one of the first and second RSM connections are wireless connections communicable with the first and second connections, respectively. In addition or the alternative, at least one of said first connection and said second connection are electrical plugs and at least one of said first and second RSM connections are corresponding electrical jacks.

13 Claims, 4 Drawing Sheets

(56) References Cited

U.S. PATENT DOCUMENTS

| | | | |
|---|---|---|---|
| 2011/0286608 A1* | 11/2011 | Hautier | H04R 5/04 |
| | | | 381/74 |
| 2011/0287719 A1 | 11/2011 | Pinder | |
| 2012/0178370 A1 | 7/2012 | George | |
| 2013/0065527 A1 | 3/2013 | George | |
| 2015/0104034 A1 | 4/2015 | Jennings | |
| 2017/0019519 A1 | 1/2017 | Lepchenske | |
| 2018/0103320 A1 | 4/2018 | Kim | |
| 2019/0110124 A1 | 4/2019 | Lamb | |
| 2019/0342664 A1 | 11/2019 | Payne | |

\* cited by examiner

REMOTE SPEAKER MICROPHONE UNIT FOR USE WITH HEADSET

RELATED APPLICATIONS

Priority is claimed from U.S. patent application Ser. No. 16/846,860, filed Apr. 13, 2020, and entitled "Remote Speaker Microphone Unit For Use With Headset", which in turn claims priority from U.S. Provisional Patent Application No. 62/835,911, filed Apr. 18, 2019, titled "Remote Speaker Microphone Unit For Use With Headset".

BACKGROUND OF THE INVENTION

First responders, military, and other emergency personnel often use radios to communicate with other personnel. Two basic types of radio communication systems are in use.

First is a system that includes a remote speaker microphone (RSM, or collar mic) unit, which is often seen being used by a police officer as one example. The user carries a radio (transceiver) on the belt. The RSM unit plugs into the radio and is basically a speaker on a cable, with a microphone and a push to talk (PTT) button on the unit. When the PTT button is not pushed, the RSM unit functions as a speaker, by which the officer can hear incoming radio communications. When the PTT button is pushed, the speaker is disabled and the microphone in the unit is enabled.

The second type of communication system that is sometimes used includes a headset. The headset includes earcups (or similar) and a boom microphone. The headset works with a stand-alone push to talk (PTT) device that is connected inline between the radio (on the user's belt) and the headset, replacing the RSM unit. The PTT can transmit both incoming and outgoing signals. The PTT unit does not include a speaker or a microphone. The PTT unit normally transmits incoming signals to the user's headset for hearing by the user. When the user wishes to talk over the radio, the user pushes the PTT button, which turns off the incoming signal and turns on the headset microphone.

There are some environments in which neither one of these systems is optimal. One such environment is a firefighting environment. A firefighter must wear a helmet in such a situation. To conform with helmet safety regulations, it is not feasible to incorporate a headset directly into the firefighter's helmet. It is, however, possible to wear a headset under the helmet, connected to a PTT unit that is inline between the radio and the headset. But the vast majority of the time when on duty, the firefighter does not wear a helmet but simply wears and uses an RSM unit, which is much more convenient and enables constant communication. When an emergency does arise, and if the firefighter wants to use the headset instead, the firefighter would need to unplug the RSM unit from the radio, locate and find a PTT unit and plug the radio into it, locate and find a headset, and plug the headset into the PTT unit. This series of tasks is often not feasible in an urgent situation. So, the firefighter typically continues with use of the RSM system.

However, tests have shown that a firefighter, when wearing a helmet and using an RSM system, in a quiet environment can only hear and comprehend at most about 90% of the radio input. In a noise intensive firefighting environment, perhaps with a fire hose running, the firefighter may only hear and comprehend about 25% of the radio input.

SUMMARY OF THE INVENTION

The present invention enables a user, such as a firefighter, to quickly and easily use a headset in conjunction with a helmet. As a result, the firefighter can hear incoming radio communications well, even in the noisy environment of fighting a fire.

In accordance with the invention, the remote speaker microphone (RSM) unit is modified to include connectors that enable the user to plug in a headset or an in-ear speaker. When neither the headset nor the in-ear speaker is plugged into the unit, the speaker and microphone(s) of the unit are active as normal. The PTT button on the unit works as normal.

When a headset is plugged into the RSM unit, that action automatically (1) disables the speaker and microphone in the unit, (2) enables the speakers in the headset, and (3) enables use of the headset microphone upon pressing the PTT button on the unit. The RSM unit becomes simply the push-to-talk mechanism for the headset.

When an in-ear speaker is plugged into the RSM unit, that action automatically (1) disables the speaker in the unit, and (2) enables the in-ear speakers. The RSM unit becomes the push-to-talk mechanism for the in-ear speaker system.

With either of these scenarios, the firefighter can hear incoming radio communications well, even in the noisy environment of fighting a fire.

In one embodiment, the invention is a remote speaker microphone unit (RSM) adapted for use as part of a radio communication system by a user carrying a radio, to enable the user to use either a headset having a first plug for connection with the RSM unit or an in-ear speaker having a second plug for connection with the RSM unit. The RSM unit comprises a built in speaker, a built in microphone, a push to talk button, a first jack adapted for receiving the first plug of the headset, and a second jack adapted for receiving the second plug of the in-ear speaker.

In another embodiment, the invention relates to a remote speaker microphone unit (RSM) adapted for use as part of a radio communication system by a user carrying a radio, to enable the user to use either a headset having a first connection connectable with the RSM unit or an in-ear speaker having a second connection connectable with the RSM unit, the RSM unit comprising a built in speaker, a built in microphone, and a push to talk button. The RSM unit also includes a first RSM connection for communicating and connectable with the first connection of the headset, and a second RSM connection for communicating and connectable with the second connection of the in-ear speaker.

In another embodiment, the invention is a radio communication system adapted for use by a user carrying a radio, to enable the user to use either a headset that has a microphone or an in-ear speaker system. The system includes a remote speaker microphone ("RSM") unit for electrical connection with the radio; headset having a first plug for connection to the RSM unit; and an in-ear speaker system having a second plug for connection to the RSM unit. The RSM unit includes a built in speaker, a built in microphone, and a PTT button. The RSM unit includes a first jack adapted for receiving the first plug of the headset, and a second jack adapted for receiving the second plug of the in-ear speaker system.

DESCRIPTION OF AN EMBODIMENT OF THE INVENTION

Figure 1:
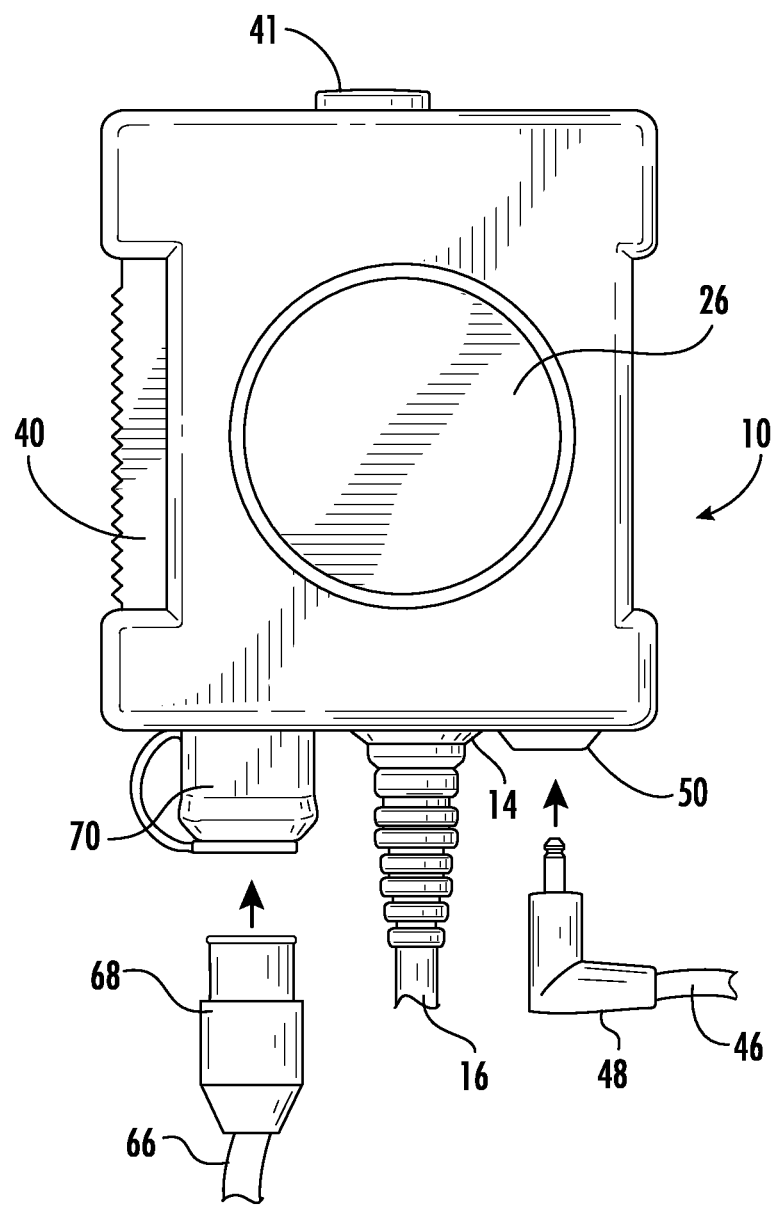
FIG. 1 illustrates a remote speaker microphone unit in accordance with a first embodiment of the invention.

Description will now be given with reference to the attached FIGS. 1-6. It should be understood that these figures are exemplary in nature and in no way serve to limit the scope of the invention, which is defined by the claims appearing hereinbelow.

The present invention relates to a remote speaker microphone ("RSM") unit that enables a user, such as a firefighter, to quickly and easily use a either a headset or an in ear speaker in conjunction with a helmet. The invention is applicable to various and different RSM units. As representative of the invention, the Figures illustrate a unit 10 that is a first embodiment of the invention.

The unit 10 is configured for use with a standard user-carried radio illustrated schematically at 12 (FIG. 5) to which it may be connected by a standard radio interface cable 14.

The unit 10 has a socket or other connection 16 for connection with the radio interface cable 14.

The unit 10 includes power, microphone, speaker, push to talk, and panic emergency activation features. Specifically, the RSM unit 10 has a built in microphone 22. In addition, the RSM unit 10 has a second microphone 24, in parallel with the first microphone 22, as a backup. When the first microphone 22 is enabled, the second microphone 24 is enabled also. The RSM unit 10 also includes a built in speaker 26.

Figure 5:
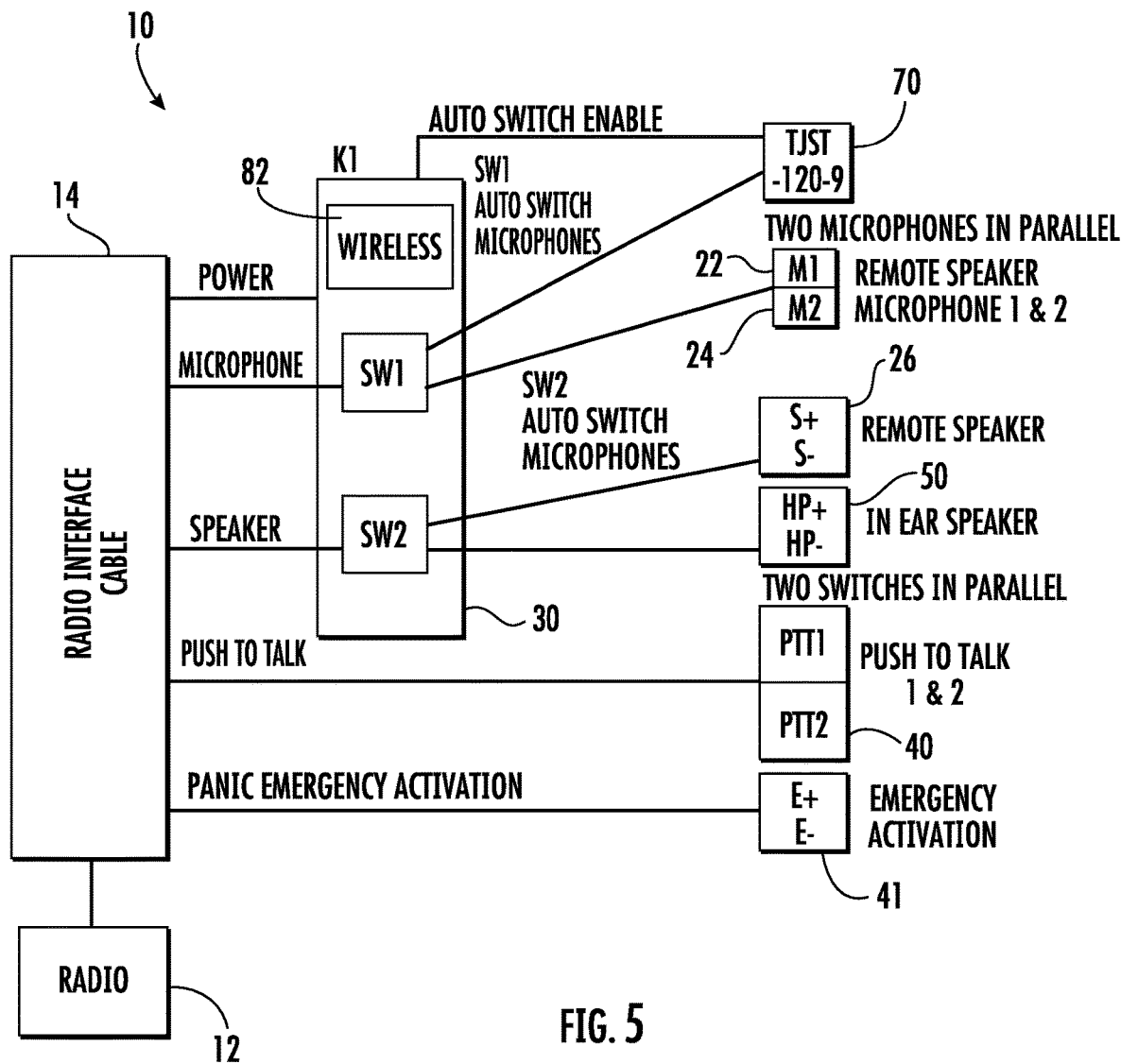
FIG. 5 is a block diagram of the remote speaker microphone unit in accordance with the invention.

The RSM unit 10 has an automatic circuit using digital and mechanical switches and a processor 30 to mute and unmute speakers and microphones as the headset or the in-ear speaker are connected. These are illustrated in FIGS. 5 and 6.

Figure 6:
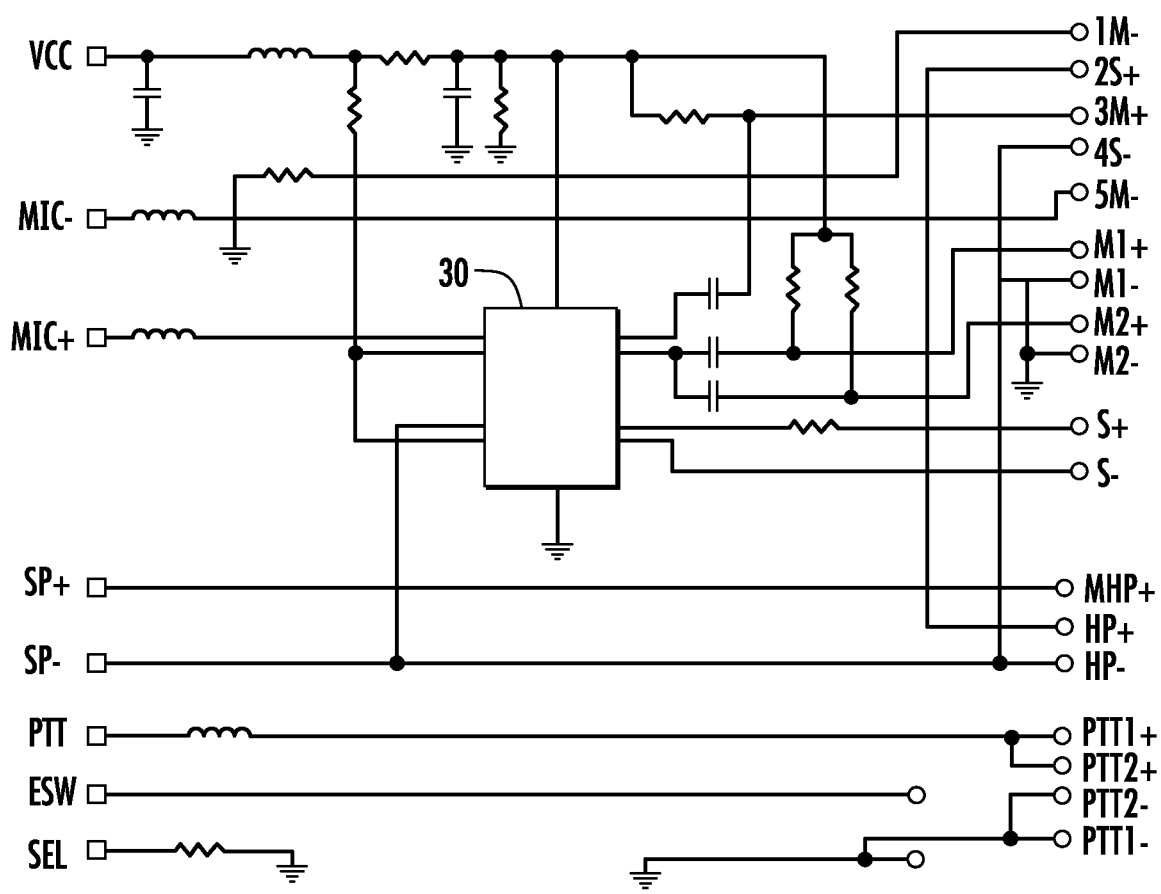
FIG. 6 is an electrical schematic diagram of the remote speaker microphone unit.

FIG. 6 is an electrical schematic diagram of the unit 10, in a known fashion. The left side is the input/output from the radio, and the right side is the input/output to the radio. A connection that is identified by a number then letter is a pin number and then function name. A connection that is identified by a letter and then number would reference as component number. VCC is power. M=Microphone, S=speaker, P=PTT, E=emergency switch, H=headphone, MHP=main headphone. + or − is the polarity of the same function name.

The unit 10 has a push-to-talk (PTT) button 40. In this embodiment, the button 40 activates two sets of contacts in parallel, with one set of contacts as a backup to the other set of contacts. The unit 10 has a single emergency push button 41 which operates in a known way to send an emergency signal out over the radio 12. All these elements of the 10 are electrically connected with the processor 30.

Figure 2:
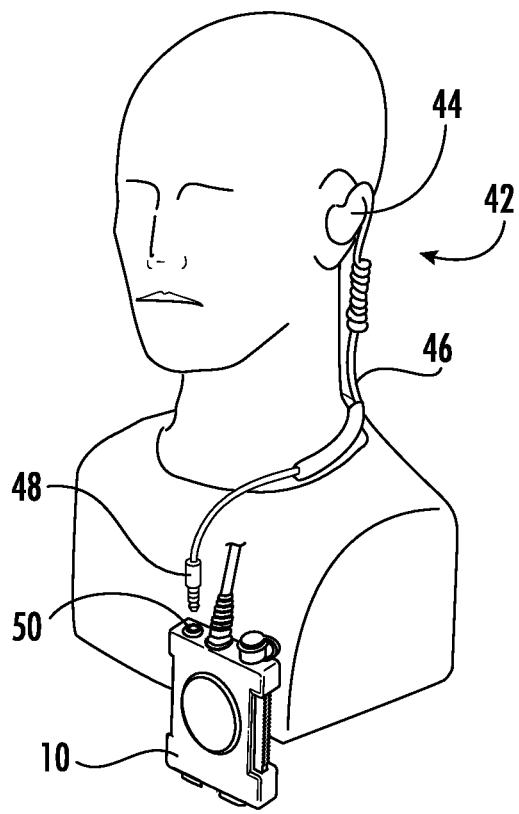
FIG. 2 illustrates an in-ear speaker system that can be used as a part of a radio communication system together with the unit of FIG. 1.

The unit 10 is usable with an in-ear speaker such as the speaker 42 illustrated in FIG. 2. The in-ear speaker 42 may be of the type commonly used with a smartphone. The in-ear speaker 42 includes one or more speaker buds 44 or the like and is electrically connectable to the RSM unit by a cable 46 that terminates in a plug or other connector 48.

The unit 10 has an HP+/HP− connection or jack 50 for connection with the in-ear speaker 42 via the connector 48. In the illustrated embodiment, the connection 50 is an HP+/HP− connection. Any other known type of connector may be employed for this connection, including a wireless connection such as Bluetooth or near field communication (NFC).

Figure 3:
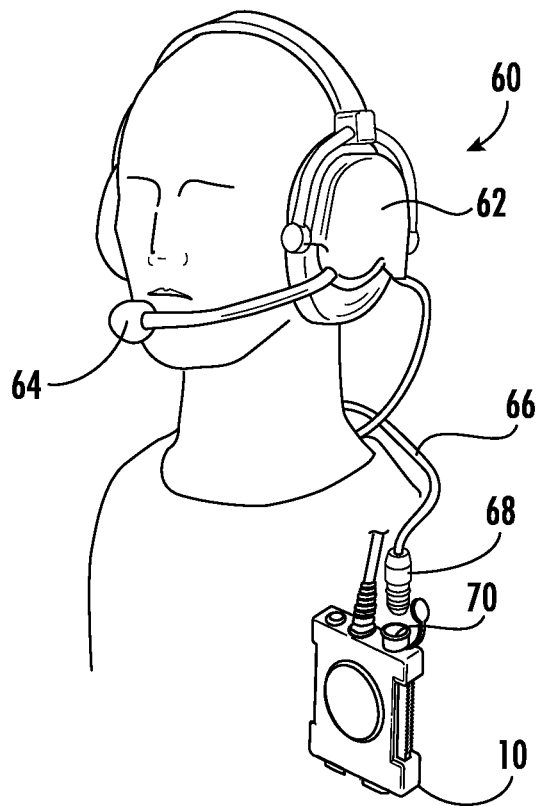
FIG. 3 illustrates a headset that can be used as a part of a communication system together with the unit of FIG. 1.
Figure 4:
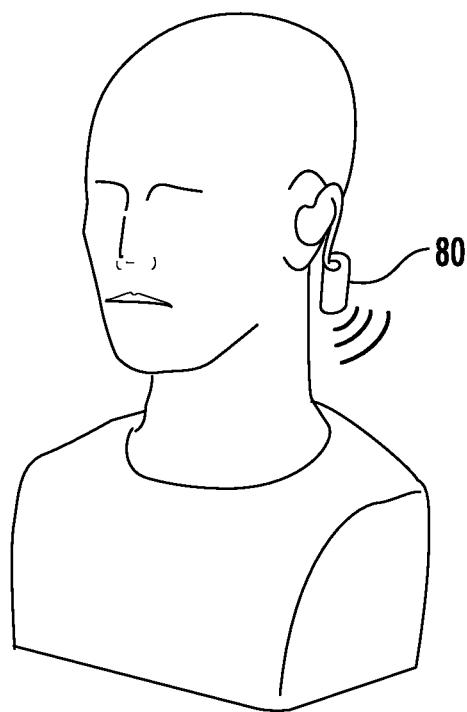
FIG. 4 illustrates a wireless ear speaker that can be used as a part of a communication system together with the unit of FIG. 1.

The unit 10 is also usable with a headset such as the headset 60 that is illustrated in FIG. 3. The headset 60 may be of any known type and as illustrated includes left and right earcups 62 and a boom microphone 64. The headset 60 is connectable to the RSM unit 10 by a headset cable 66 that terminates in a plug or other connector 68.

The unit 10 has a connection or jack 70 for connection with the headset 60 via the headset connector 68. In the illustrated embodiment, the connection 70 is a TJST-600-9 connection. Any other known type of connector may be employed for this connection, including a wireless connection such as Bluetooth or NFC.

When neither the headset 60 nor the ear speaker 42 is plugged into the RSM unit 10, the RSM unit 10 operates like a normal RSM unit. The radio interface cable 14 is plugged in to the radio 12 and into the RSM unit 10. Incoming radio signals are routed through the cable 14 to the RSM unit's speaker 26, to be made audible to the user. When the user wishes to transmit through the radio 12, the user presses the PTT button 40. This action disables the speaker 26 and enables the microphone 22. The backup microphone 24 is available should the main microphone 22 fail. Releasing the PTT button 40 enables the speaker 26 again.

If the user plugs the headset 60 into the jack 70, the processor 30 senses that connection, and in response automatically disables the built-in speaker 26 and the built-in microphone 22. Incoming radio signals are automatically routed to the headset 60 via the jack 70. The connection via the jack 70 also enables the headset microphone 64. As a result, the user is able to both hear and speak via the headset 60 and the radio 12, in those circumstances in which such operation is preferred by the user.

When the headset 60 is thereafter unplugged from the jack 70, the processor 30 senses that action and automatically re-enables the built-in speaker 26 and the built-in microphone 22.

Alternatively, the user can use the in-ear speaker 42. To do that, the user plugs the in-ear speaker connector 48 into the jack 50 on the RSM unit 10. The processor 30 senses that action, and in response both (1) automatically disables the built-in speaker 26, and (2) routes incoming radio signals to the in-ear speaker 42 via the jack 50. In this way, the user can use the in-ear speaker 42 in those circumstances in which such operation is preferred by the user.

When the in-ear speaker 42 is thereafter unplugged from the jack 50, the processor 30 senses that action, and in response automatically enables the built-in speaker 26.

The emergency push button 41 works in the normal manner regardless of how the RSM unit 10 is set up and connected.

The unit 10 includes one or more wireless options. This option enables the user to wear one or more wireless earpieces 80. As indicated at 82 in FIG. 5, appropriate circuitry is included in the RSM unit 10 to enable this feature; the design of such circuitry is within the skill of a person of ordinary skill in the art. As such, the RSM unit 10 is usable with a wireless earpiece, as indicated schematically in FIG. 4.

It can be seen that the present invention enables a user, such as a firefighter, to quickly and easily replace a headset with an in-ear speaker when donning a helmet, because the RSM unit 10 does not have to be swapped out. When an in-ear speaker is plugged into or otherwise connects with the RSM unit 10, that action automatically (1) disables the speaker in the RSM unit, and (2) enables the in-ear speakers. The RSM unit 10 becomes the push-to-talk mechanism for the in-ear speaker.

Because of the ease of replacing the headset 60 with the in-ear speaker 42, the user can enjoy significantly increased hearing and comprehension even in a very noisy environment. This advantage is available without the user needing to replace the RSM unit 10.

As a result, the present invention can increase the firefighter's ability to hear incoming radio communications well even in the noisy environment of fighting a fire.

The invention is not limited to the embodiment described above. For example, both of the headset and the in-ear speaker are described as having wired connections that are physically pluggable into the RSM unit. However, one or both of those can utilize wireless technology, e.g., such as Bluetooth or near field communication (NFC) protocols, so as to eliminate the wired connection and make the device easier to use, especially in emergencies such as those typically required of first responders, military, and other emergency personnel.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

The invention claimed is:

1. An emergency services remote speaker microphone unit (RSM) adapted for use as part of a radio communication system by an emergency services user, such as a firefighter, carrying a radio, to enable the user to use either a headset having a first plug for connection with the RSM unit or an in-ear speaker having a second plug for connection with the RSM unit, the RSM unit comprising:
    a built-in speaker, at least first and second built-in microphones, connected in parallel, and a push to talk button, wherein when said first built-in microphone is enabled, said second built-in microphone is also enabled;
    a first jack adapted for receiving the first plug of the headset; and
    a second jack adapted for receiving the second plug of the in-ear speaker.

2. An emergency services RSM unit as set forth in claim 1, further comprising a processor configured to operate the radio in a user-selected one of three different modes including:
    a first mode, when neither the headset nor the in-ear speaker are plugged in to the emergency services RSM unit and as a result the emergency services RSM unit built-in speaker and said built-in microphones are active;
    a second mode, when the headset is plugged in to the RSM unit and as a result the headset is operable and the built-in speaker and the built-in microphones are disabled; and
    a third mode, when the in-ear speaker is plugged in to the emergency services RSM unit and as a result the in-ear speaker is operable and both the built-in speaker and the built-in microphones are disabled.

3. An emergency services RSM unit as set forth in claim 1 that includes an automatic circuit including digital and mechanical switches that mutes and unmutes said speakers and said microphones when either a headset or an in-ear speaker is plugged in to the emergency services RSM unit or unplugged from the emergency services RSM unit.

4. An emergency services RSM unit as set forth in claim 3 wherein the automatic circuit includes a processor that interfaces with the mechanical switches to operate the radio in a user-selected one of three different modes:
    a first mode, when neither the headset nor the in-ear speaker is plugged in to the emergency services RSM unit and as a result the emergency services RSM unit built-in speaker and built-in microphones are active;
    a second mode, when the headset is plugged in to the emergency services RSM unit and as a result the headset is operable and the built-in speaker and the built-in microphones are disabled; and
    a third mode, when the in-ear speaker is plugged in to the emergency services RSM unit and as a result the in-ear speaker is operable and the built-in speaker and the built-in microphones are disabled.

5. An emergency services RSM unit according to claim 1, wherein plugging in either the headset or the in-ear speaker disables the built in speaker and built-in microphones of the emergency services RSM unit.

6. An emergency services RSM unit according to claim 1, said PTT button comprising at least two sets of contacts in parallel, with one set of contacts as a backup to the other set of contacts.

7. An emergency services remote speaker microphone unit (RSM) adapted for use as part of a radio communication system by an emergency services user, such as a firefighter, carrying a radio, to enable the user to use either a headset having a first connection connectable with the RSM unit or an in-ear speaker having a second connection connectable with the RSM unit, the RSM unit comprising:
    a built in speaker, a at least first and second built-in microphones, connected in parallel, and a push to talk button, wherein when said first built-in microphone is enabled, said second built-in microphone is also enabled;
    a first RSM connection for communicating and connectable with the first connection of the headset; and
    a second RSM connection for communicating and connectable with the second connection of the in-ear speaker.

8. An emergency services RSM unit according to claim 7 further comprising a processor configured to operate the radio in a user-selected one of three different modes including:
    a first mode, when neither the headset nor the in-ear speaker is connected to the emergency services RSM unit and as a result the emergency services RSM unit built-in speaker and built-in microphones are active;
    a second mode, when the headset is connected to the emergency services RSM unit and as a result the headset is operable and the built-in speaker and the built-in microphones are disabled; and
    a third mode, when the in-ear speaker is connected to the emergency services RSM unit and as a result the in-ear speaker is operable and both the built-in speaker and the built-in microphones are disabled.

9. An emergency services RSM unit according to claim 7, wherein at least one of said first connection and said second connection are wireless connections and at least one of said first RSM connection and said second RSM connection are wireless connections adapted to communicate with said first and second connections, respectively.

10. An emergency services RSM unit according to claim 9, wherein said first and second connections and said first and second RSM connections are at least one of Bluetooth or near field communication connections.

11. An emergency services RSM unit according to claim 7, wherein at least one of said first connection and said second connection are electrical plugs and at least one of said first RSM connection and said second RSM connection are electrical jacks adapted to receive and communicate with said first and second connections, respectively.

12. An emergency services RSM unit according to claim 7, wherein connecting either the headset or the in-ear speaker to the RSM unit disables the built in speaker and built-in microphones of the RSM unit.

13. An emergency services RSM unit according to claim 7, said PTT button comprising at least two sets of contacts in parallel, with one set of contacts as a backup to the other set of contacts.

\* \* \* \* \*